(12) United States Patent
Muleski (10) Patent No.: US 11,098,776 B2
(45) Date of Patent: Aug. 24, 2021

(54) TOOL FOR REMOVING A BRAKE PISTON FROM A BRAKE ASSEMBLY OF A WIND TURBINE AND RELATED METHOD

(71) Applicant: General Electric Company, Schenectady, NY (US)

(72) Inventor: Steven Bernard Muleski, Salina, KS (US)

(73) Assignee: General Electric Company, Schenectady, NY (US)

( * ) Notice: Subject to any disclaimer, the term of this patent is extended or adjusted under 35 U.S.C. 154(b) by 184 days.

(21) Appl. No.: 15/661,407

(22) Filed: Jul. 27, 2017

(65) Prior Publication Data

US 2019/0032736 A1  Jan. 31, 2019

(51) Int. Cl.
*B25B 27/14* (2006.01)
*F03D 7/02* (2006.01)
*F16D 65/00* (2006.01)
*B25B 27/02* (2006.01)
*B25B 27/06* (2006.01)
*F16D 125/06* (2012.01)

(52) U.S. Cl.
CPC ........ *F16D 65/0043* (2013.01); *B25B 27/023* (2013.01); *B25B 27/062* (2013.01); *B25B 27/14* (2013.01); *F03D 7/0248* (2013.01); *F05B 2230/70* (2013.01); *F05B 2260/902* (2013.01); *F16D 2125/06* (2013.01); *F16D 2250/0084* (2013.01)

(58) Field of Classification Search
CPC ..... B25B 27/023; B25B 27/062; B25B 27/14; F03D 7/0248; F05B 2230/70; F05B 2260/902; F16D 2125/06; F16D 2250/0084; F16D 65/0043
USPC ........................................... 29/265
See application file for complete search history.

(56) References Cited

U.S. PATENT DOCUMENTS

| | | | | |
|---|---|---|---|---|
| 1,570,338 A | * | 1/1926 | Davis | B25B 27/062 29/262 |
| 1,650,964 A | * | 11/1927 | Schmitt | B25B 27/062 29/262 |
| 2,609,597 A | * | 9/1952 | Claps | B25B 27/062 29/265 |
| 2,755,540 A | * | 7/1956 | Crozier | B25B 27/023 29/265 |

(Continued)

OTHER PUBLICATIONS

Extended European Search Report and Opinion issued in connection with corresponding EP Application No. 18185571.9 dated Jan. 3, 2019.

*Primary Examiner* — Joseph J Hail
*Assistant Examiner* — Arman Milanian
(74) *Attorney, Agent, or Firm* — Dority & Manning, P.A.

(57) ABSTRACT

The present disclosure is directed to a tool for removing a brake piston from a brake assembly of a wind turbine. The tool includes a base member configured for placement on a surface of a brake piston sleeve. The tool also includes a puller assembly configured for insertion into an inner cavity defined by the brake piston. The puller assembly includes a first shaft and a collet coupled to the first shaft. The first shaft is moveable relative to the base member. The collet is configured to engage an inner surface of the brake piston. Moving the first shaft relative to the base member slides the brake piston relative to the brake piston sleeve.

8 Claims, 8 Drawing Sheets

(56) References Cited

U.S. PATENT DOCUMENTS

| | | | | |
|---|---|---|---|---|
| 3,052,973 A | * | 9/1962 | Williams | B25B 27/023 29/265 |
| 3,055,093 A | * | 9/1962 | Ruble | B25B 27/023 29/265 |
| 3,340,593 A | * | 9/1967 | Savastano | F16C 35/062 29/262 |
| 3,786,551 A | * | 1/1974 | Gregg | B25B 27/02 29/266 |
| 4,009,515 A | | 3/1977 | Racin | |
| 4,021,904 A | | 5/1977 | Constant | |
| 4,694,569 A | * | 9/1987 | Colvell | B25B 27/023 29/257 |
| 4,852,235 A | * | 8/1989 | Trease | B25B 27/023 29/263 |
| 5,276,951 A | * | 1/1994 | Gluszek | B25B 27/062 29/265 |
| 5,623,761 A | * | 4/1997 | Chiang | B25B 27/062 29/260 |
| 6,192,566 B1 | * | 2/2001 | Dunum | B25B 27/0035 29/233 |
| 2003/0192158 A1 | * | 10/2003 | Reale | B25B 27/062 29/235 |

* cited by examiner

TOOL FOR REMOVING A BRAKE PISTON FROM A BRAKE ASSEMBLY OF A WIND TURBINE AND RELATED METHOD

FIELD

The present disclosure generally relates to wind turbines. More particularly, the present disclosure relates to tools for removing brake pistons from brake assemblies of wind turbines and related methods.

BACKGROUND

Wind power is considered one of the cleanest, most environmentally friendly energy sources presently available, and wind turbines have gained increased attention in this regard. A modern wind turbine typically includes a tower, a nacelle mounted on the tower, a generator positioned in the nacelle, and one or more rotor blades. The one or more rotor blades convert kinetic energy of wind into mechanical energy using known airfoil principles. A drivetrain transmits the mechanical energy from the rotor blades to the generator. The generator then converts the mechanical energy to electrical energy, which may be supplied to a utility grid.

Wind turbines typically include one or more yaw adjustment mechanisms, which rotate the nacelle relative to the tower to properly orient the rotor blades relative to the direction of the wind. To control such rotation, a wind turbine may include one or more brake assemblies having brake pads that frictionally engage the tower (e.g., a tower ring gear). The frictional sliding between the brake pads and the tower causes the pads to wear over time. As such, it is necessary to periodically replace the brake pads.

In certain instances, brake pistons to which the brake pads are coupled may become stuck in the brake assembly, especially when the brake pads are severely worn. When this occurs, it becomes necessary to use time-consuming and expensive processes, such as cutting, to remove the brake pistons from the brake assembly.

Accordingly, a tool and associated method of use for removing a brake piston from a brake assembly of a wind turbine would be welcomed in the art.

BRIEF DESCRIPTION

Aspects and advantages of the technology will be set forth in part in the following description, or may be obvious from the description, or may be learned through practice of the technology.

In one aspect, the present disclosure is directed to a tool for removing a brake piston from a brake assembly of a wind turbine. The tool includes a base member configured for placement on a surface of a brake piston sleeve. The tool also includes a puller assembly configured for insertion into an inner cavity defined by the brake piston. The puller assembly includes a first shaft and a collet coupled to the first shaft. The first shaft is moveable relative to the base member. The collet is configured to engage an inner surface of the brake piston. Moving the first shaft relative to the base member slides the brake piston relative to the brake piston sleeve.

In another aspect, the present disclosure is directed to a method for removing a brake piston from a brake assembly of a wind turbine. The method includes inserting a puller assembly into an inner cavity defined by the brake piston. The puller assembly includes a first shaft and a collet coupled to the first shaft. The collet is configured to engage an inner surface of the brake piston. The method also includes positioning a base member on a surface of a brake piston sleeve. The first shaft is moveable relative to base member. The method further includes moving the puller assembly relative to the base plate.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Figure 1:
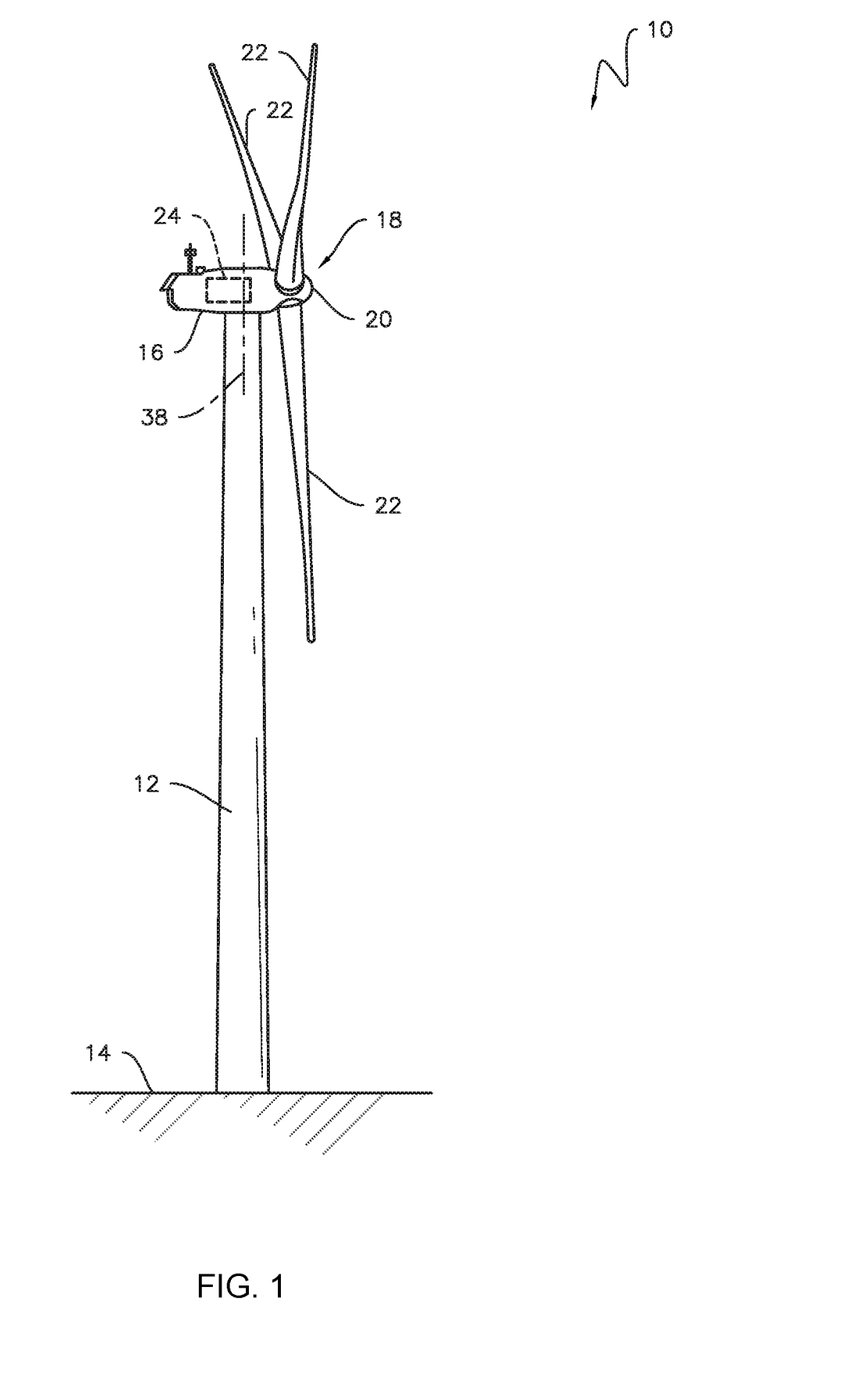
FIG. 1 is a perspective view of a wind turbine in accordance with embodiments of the present disclosure.

Referring now to the drawings, FIG. 1 is a perspective view of an exemplary wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outward from the hub 20. For example, in the embodiment shown in FIG. 1, the rotor 18 includes three rotor blades 22. In alternative embodiments, however, the rotor 18 may include more or less than three rotor blades 22. Each rotor blade 22 may be spaced about the hub 20 to facilitate rotation of the rotor 18 to convert kinetic energy from the wind into usable rotational, mechanical energy. A generator 24 positioned in the nacelle 16 may generate electrical power from the rotational energy of the rotor 18.

Figure 2:
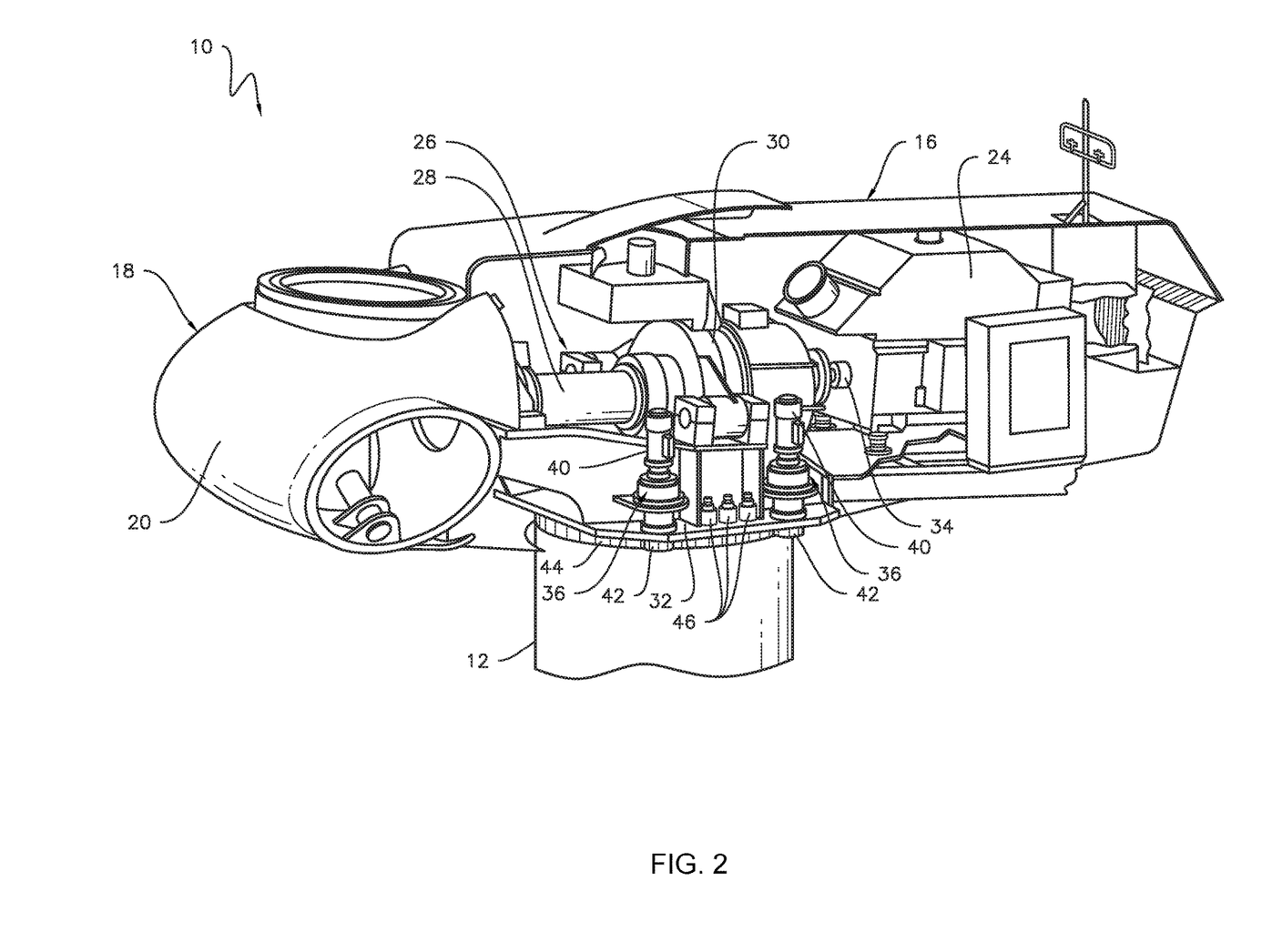
FIG. 2 is a perspective, internal view of a nacelle of a wind turbine in accordance with embodiments of the present disclosure.

Referring now to FIG. 2, a drivetrain 26 rotatably couples the rotor 18 to the electric generator 24. As shown, the drivetrain 26 may include a rotor shaft 28, which rotatably couples the hub 20 of the rotor 18 to a gearbox 30. The gearbox 30 may be supported by and coupled to a bedplate 32 in the nacelle 16. The drivetrain 26 may also include a generator shaft 34, which rotatably couples the gearbox 30 to the generator 24. In this respect, rotation of the rotor 18 drives the generator 24. More specifically, the rotor shaft 28 may provide a low speed, high torque input to the gearbox 30 in response to rotation of the rotor blades 22 and the hub 20. The gearbox 30 may then convert the low speed, high torque input to a high speed, low torque output to drive the generator shaft 34 and, thus, the generator 24. In alternate embodiments, however, the generator 24 may be directly rotatably coupled to the rotor shaft 28 in a direct-drive configuration.

The wind turbine 10 may also include one or more yaw adjustment mechanisms 36 for adjusting a yaw angle of the nacelle 16 (i.e., the angular orientation of the nacelle 16 relative to the tower 12). In particular, the nacelle 16 may be rotatably coupled to the tower 12 by a yaw bearing (not shown). As such, the yaw adjustment mechanisms 36 may rotate the nacelle 16 about a yaw axis 38 (FIG. 1) relative to the tower 12, thereby adjusting the yaw angle of the nacelle 16. Although FIG. 2 only illustrates two yaw adjustment mechanisms 36, the wind turbine 10 may include any suitable number of yaw adjustment mechanisms 36, such as a single yaw adjustment mechanism 36 or more than two yaw adjustment mechanisms 36.

FIG. 2 illustrates an exemplary embodiment of the yaw adjustment mechanisms 36. More specifically, each yaw adjustment mechanism 36 may include an electric motor 40 mounted to and/or through the bedplate 32. Each electric motor 40 may include a pinion gear 42 coupled thereto, which engages a tower ring gear 44 coupled to the tower 12. During operation of the yaw adjustment mechanisms 36, the electric motors 40 rotate the corresponding pinion gear 42, which rotates the tower ring gear 44. The rotation of the pinion gears 42 relative to the tower ring gear 44 causes the nacelle 16 to rotate about the yaw axis 38. In alternate embodiments, the yaw adjustment mechanisms 36 may include any suitable type of actuator and/or any suitable structure or mechanism for transmitting movement between the tower 12 and the nacelle 16.

Referring still to FIG. 2, the wind turbine 10 may also include one or more brake assemblies 46 for controlling the rotation of the nacelle 16 about the yaw axis 38. For example, as shown in the illustrated embodiment, the brake assemblies 46 may be mounted to and/or through the bedplate 32. As such, each brake assembly 46 may frictionally engage the tower ring gear 44 or another suitable friction surface of the wind turbine 10 to stop, slow, and/or otherwise control the rotation of the nacelle 16 about the yaw axis 38. The wind turbine 10 may include any suitable number of yaw brake assemblies 46. For instance, in an exemplary embodiment, the wind turbine 10 may include between twelve and twenty brake assemblies 46. In other embodiments, however, the wind turbine 10 may include less than twelve brake assemblies 46 or more than twenty brake assemblies 46.

Figure 3:
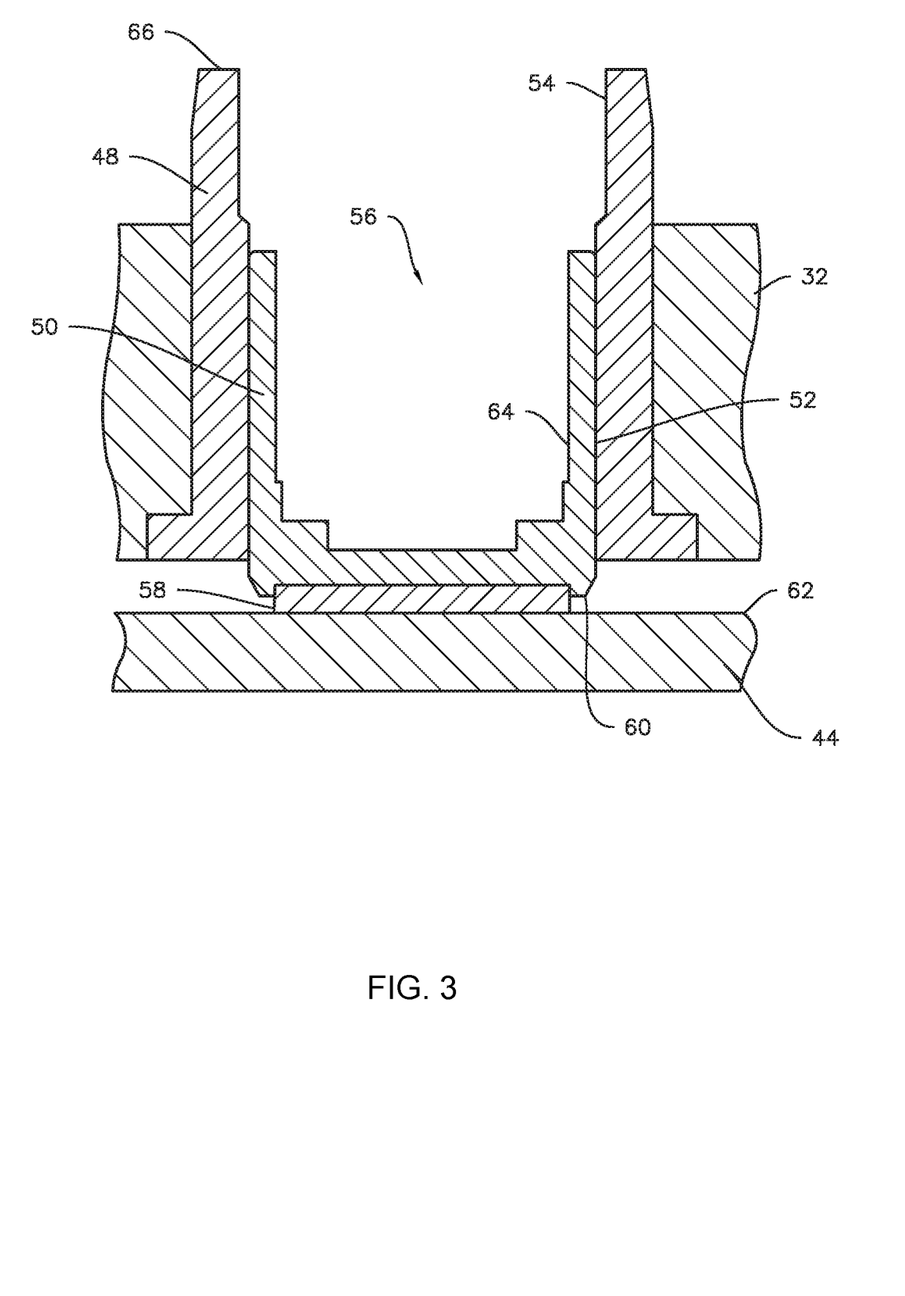
FIG. 3 is a cross-sectional of a brake assembly of a wind turbine in accordance with embodiments of the present disclosure.

FIG. 3 illustrates an exemplary embodiment of one of the brake assemblies 46. As shown, the brake assembly 46 may include a brake piston sleeve 48 extending through the bed plate 32 of the nacelle 16. The brake assembly 46 may also include a brake piston 50 slideably positioned within the brake piston sleeve 48. In particular, an outer surface 52 of the brake piston 50 may slide relative to an inner surface 54 of the brake piston sleeve 48. The brake piston 50 may also define an inner cavity 56. In some embodiments, the cavity 56 may receive a thrust piece (not shown) or other suitable structure for pushing or pressing the brake piston 50 against the tower ring gear 44. Furthermore, the brake piston 50 may include a puck or brake pad 58 coupled to a bottom surface 60 of the brake piston 50. In this respect, the brake piston 50 may be configured to be pushed or pressed against a friction surface 62 of the tower ring gear 44 to maintain frictional engagement (e.g., a constant frictional force) between the brake pad 58 and the tower ring gear 44 during rotation of the nacelle 16. Such frictional engagement may cause the brake pad 58 may wear over time.

Figure 4:
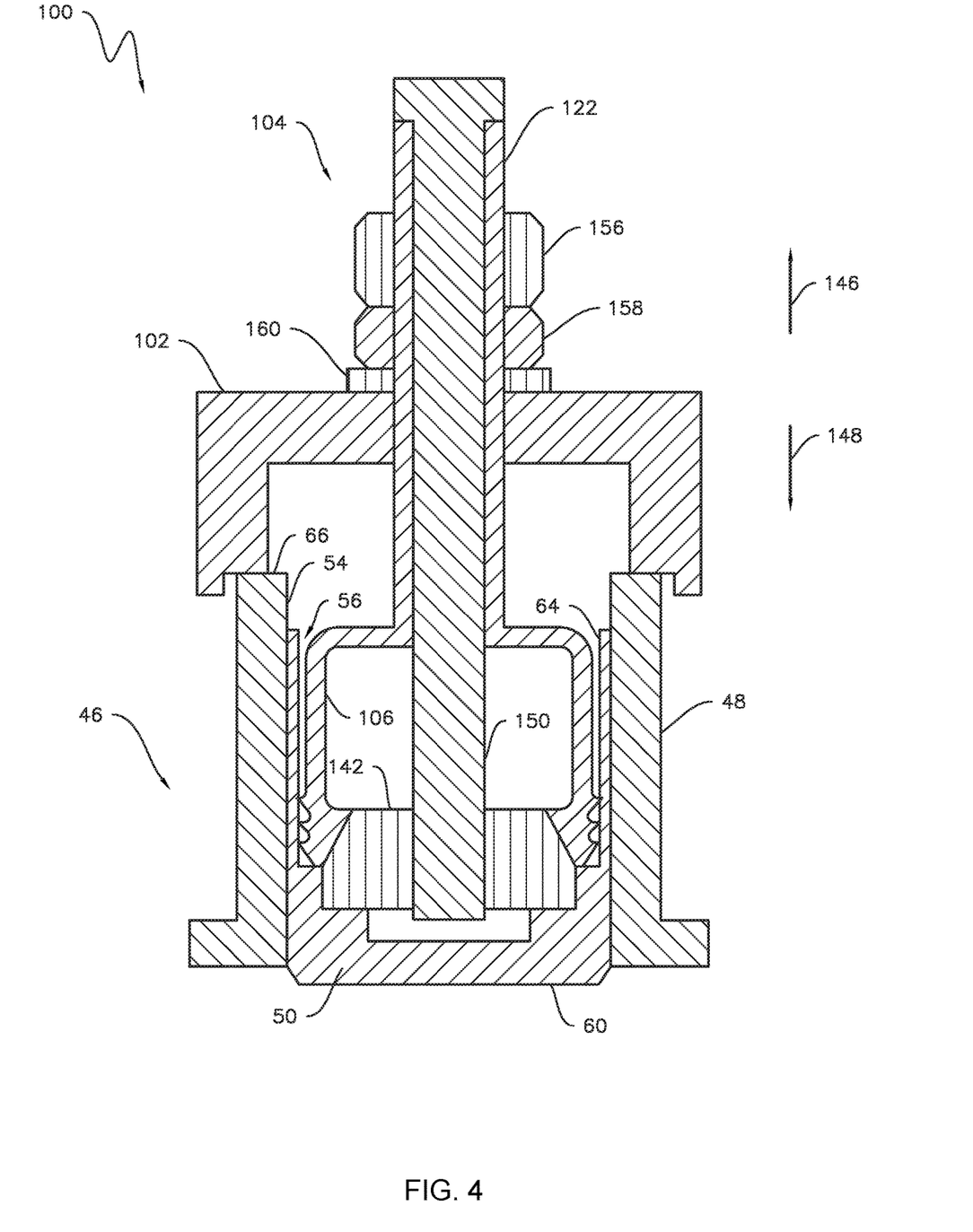
FIG. 4 is a cross-sectional view of a tool for removing a brake piston from a brake assembly of a wind turbine in accordance with embodiments of the present disclosure.

FIG. 4 illustrates one embodiment of a tool 100 for removing the brake piston 50 from the brake assembly 46 of the wind turbine 10. As shown, the tool 100 generally includes a base member 102 configured for placement on the brake piston sleeve 48. The tool 100 also includes a puller assembly 102 configured for insertion into the cavity 56 of the brake piston 50. As will be described in greater detail below, a collet 106 of the puller assembly 100 engages an inner surface of the brake piston 50. In this respect, moving the puller assembly 104 relative to the base member 102 causes the brake piston 50 to slide relative to the brake piston sleeve 48, thereby removing the brake piston 50 from the brake assembly 46.

Figure 5:
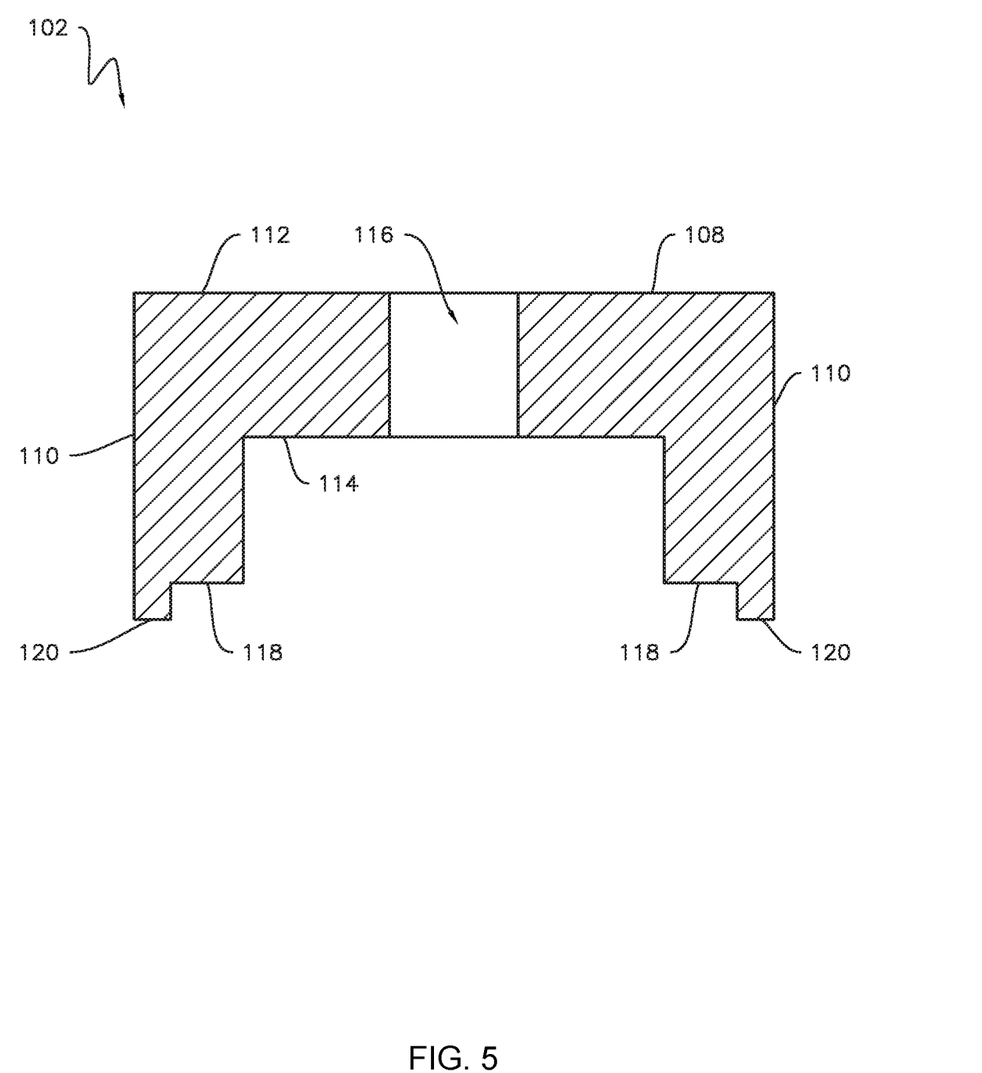
FIG. 5 is a cross-sectional view of a base member in accordance with embodiments of the present disclosure.

Referring now to FIGS. 4 and 5, the base member 102 may include a pull plate 108 and one or more legs 110. As shown, the pull plate 108 may generally be oriented perpendicular to the brake piston sleeve 48 to extend across at least a portion of the brake piston 50. The pull plate 108 may include a top surface 112 and an opposing bottom surface 114 and may define an aperture 116 through which the puller assembly 104 extends. The legs 110 may extend outward from the bottom surface 114 of the pull plate 108. As such, the legs 110 may be configured for placement on the brake piston sleeve 48. In particular, a bottom surface 118 of the legs 110 may be configured for placement on a top surface 66 of the brake piston sleeve 48. The legs 110 may include projections 120 to prevent the base member 102 from sliding off of the brake piston assembly 48. In the embodiment shown in FIGS. 4 and 5, the base member 102 includes two legs 100. Nevertheless, the base member 102 may include any suitable number of legs 110, such as a single leg 110 or more than two legs 110, in alternate embodiments. Furthermore, although FIGS. 4 and 5 illustrate the base member 102 as a single component, the base member 102 may also be two or more separate components.

Figure 6:
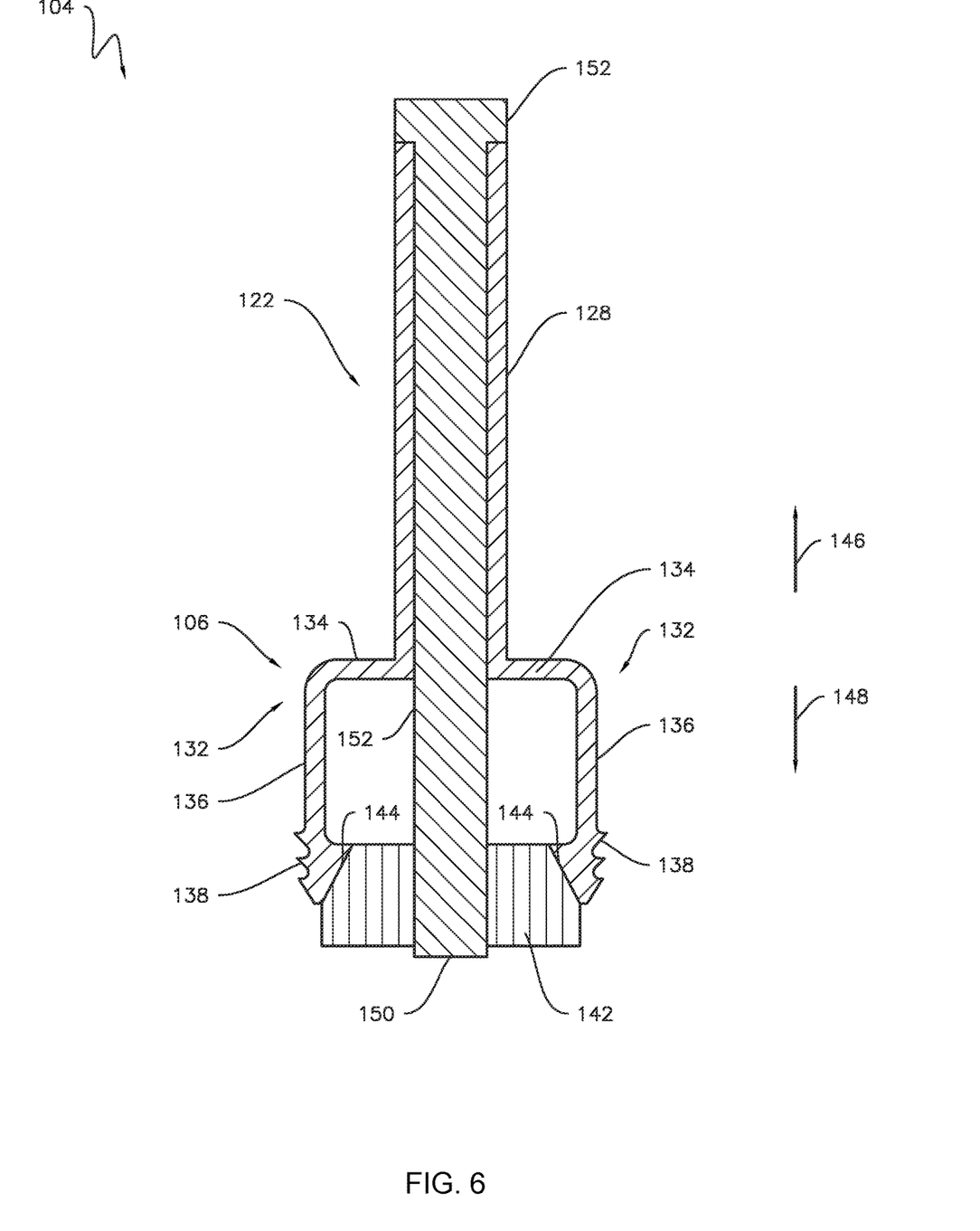
FIG. 6 is a cross-sectional view of a puller assembly in accordance with embodiments of the present disclosure.
Figure 7:
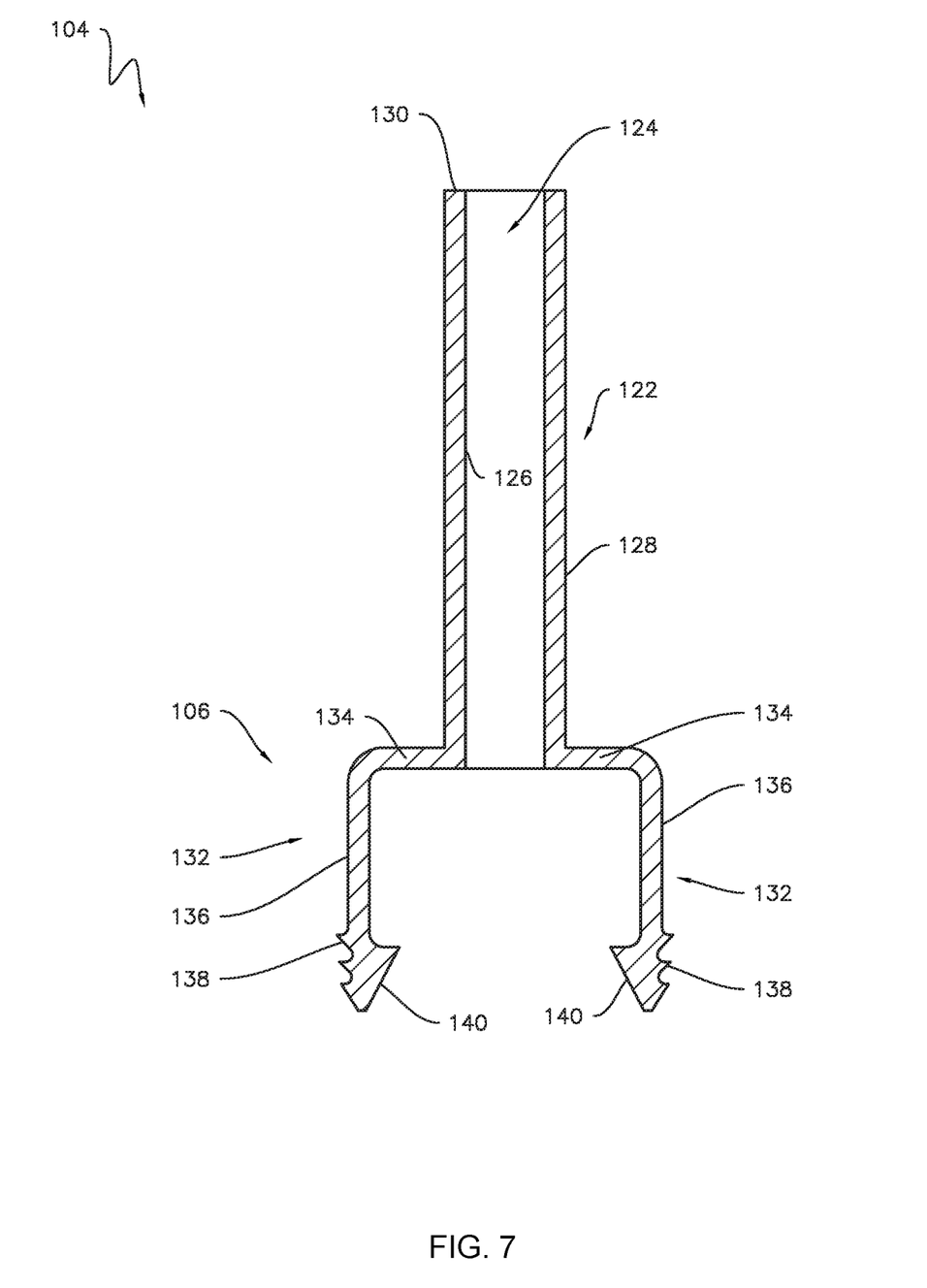
FIG. 7 is a cross-sectional view of a first shaft and a collet of a base member in accordance with embodiments of the present disclosure.

Referring now to FIGS. 4, 6, and 7, the puller assembly 104 includes a first shaft 122. As shown, the first shaft 122 may be annular, thereby defining a passage 124 extending therethrough. In this respect, the first shaft 122 may define an inner surface 126, an outer surface 128, and top surface 130. The first shaft 122 is moveable relative to the base member 102 to permit the puller assembly 104 to move relative to the base member 102. For example, the first shaft 122 may extend through the aperture 116 in the pull plate 108. As such, the outer surface 128 of the first shaft 122 may slide relative to the pull plate 108. Furthermore, the first shaft 122 couples to the collet 106. The collet 106 and the first shaft 122 may be integrally formed as shown in FIGS. 4, 6, and 7 or separate components fixedly coupled together (e.g., via welding or a threaded connection). In alternate embodiments, however, the first shaft 122 may have any suitable configuration. For example, the first shaft 122 may be a solid rod.

As mentioned above, the puller assembly 104 includes the collet 106, which engages the inner surface 64 of the brake piston 50. More specifically, in several embodiments, the collet 106 may include a plurality of arms 132. For example, the arms 132 may have an L-shaped configuration. In this respect, each arm 132 may include a first arm portion 134 extending outward from the first shaft 122 and a second arm portion 136 extending downward from the corresponding first arm portion 134. As shown, the second arm portions 136 may engage the inner surface 64 of the brake piston 50. For example, in one embodiment, each second arm portion 136 may include a plurality of teeth 138, which engages or otherwise grips the inner surface 64 of the brake piston 50. Furthermore, each second arm portion 136 may include a surface 140 positioned inward from the teeth 138. In some embodiments, the surfaces 140 may be oblique relative to the longitudinal axis of first shaft 122. Although the embodiment shown in FIGS. 4, 6, and 7 includes two arms 132, the collet 106 may include any suitable number of arms 132, such as more than two arms 132. Additionally, the collet 106 may have any suitable configuration or structure for engaging the inner surface 64 of the brake piston 50.

Referring now to FIGS. 4 and 6, the puller assembly 104 may also include a disk 142 positioned in sliding engagement with the collet 106. More specifically, the disk 142 may include an angled surface 144 in sliding contact with the surfaces 140 of the arms 132 of the collet 106. In this respect, sliding the disk 142 in a first direction (e.g., as indicated by arrow 146) moves the arms 132 of the collet 106 outward and into engagement with the inner surface 64 of the brake piston 50. Conversely, sliding the disk 142 in a second, opposite direction (e.g., as indicated by arrow 148) moves the arms 132 of the collet 106 inward and out of engagement with the inner surface 64 of the brake piston 50. Although the disk 142 is illustrated as having a frustoconical configuration in FIGS. 4 and 6, the disk 142 may have any suitable configuration that allows the collet 106 to engage and disengage the inner surface 64 of the brake piston 50.

The puller assembly 104 may further include a second shaft 150 coupled to the disk 142. As such, the second shaft 150 may be configured to slide the disk 142 relative to the collet 106. In several embodiments, the second shaft 150 may extend through the passage 124 in the first shaft 122 such that the first and second shafts 122, 150 may be concentric with each other. The first and second shafts 122, 150 may be movable relative to each other. For example, in one embodiment, an outer surface 152 of the second shaft 150 may threadingly engage the inner surface 126 of the first shaft 122. In this respect, rotating the second shaft 150 relative to the first shaft 122 may cause the second shaft 150 to move (i.e., in the first or second directions 146, 148) relative to the first shaft 122, thereby causing the collet 106 to engage or disengage the brake piston 50. Some embodiments of the second shaft 150 may include a bolt head 154 to facilitate rotation of the second shaft 150 with, e.g., a socket or wrench. In alternate embodiments, however, the second shaft 150 may have any suitable configuration.

Referring now to FIG. 4, the tool 104 may include a nut 156 that moves the puller assembly 104 relative to the base member 102. More specifically, the nut 156 may threadingly engage the outer surface of the 128 of the first shaft 122 above the base member 102. In this respect, rotating the nut 156 relative to the first shaft 122 may cause the puller assembly 104 to move relative to the base member 102. In particular, tightening the nut 156 may cause the puller assembly 104 to move in the first direction 146. When the collet 106 is in engagement with the inner surface 54 of the brake piston 50, tightening the nut 156 may exert an upward force on the brake piston 50, thereby causing the brake piston 50 to slide relative to the brake piston sleeve 48. In some embodiments, a thrust bearing 158 and/or a washer 160 may be positioned between the nut 156 and the top surface 112 of the pull plate 108 to facilitate relative movement between the puller assembly 104 and the base member 102.

Figure 8:
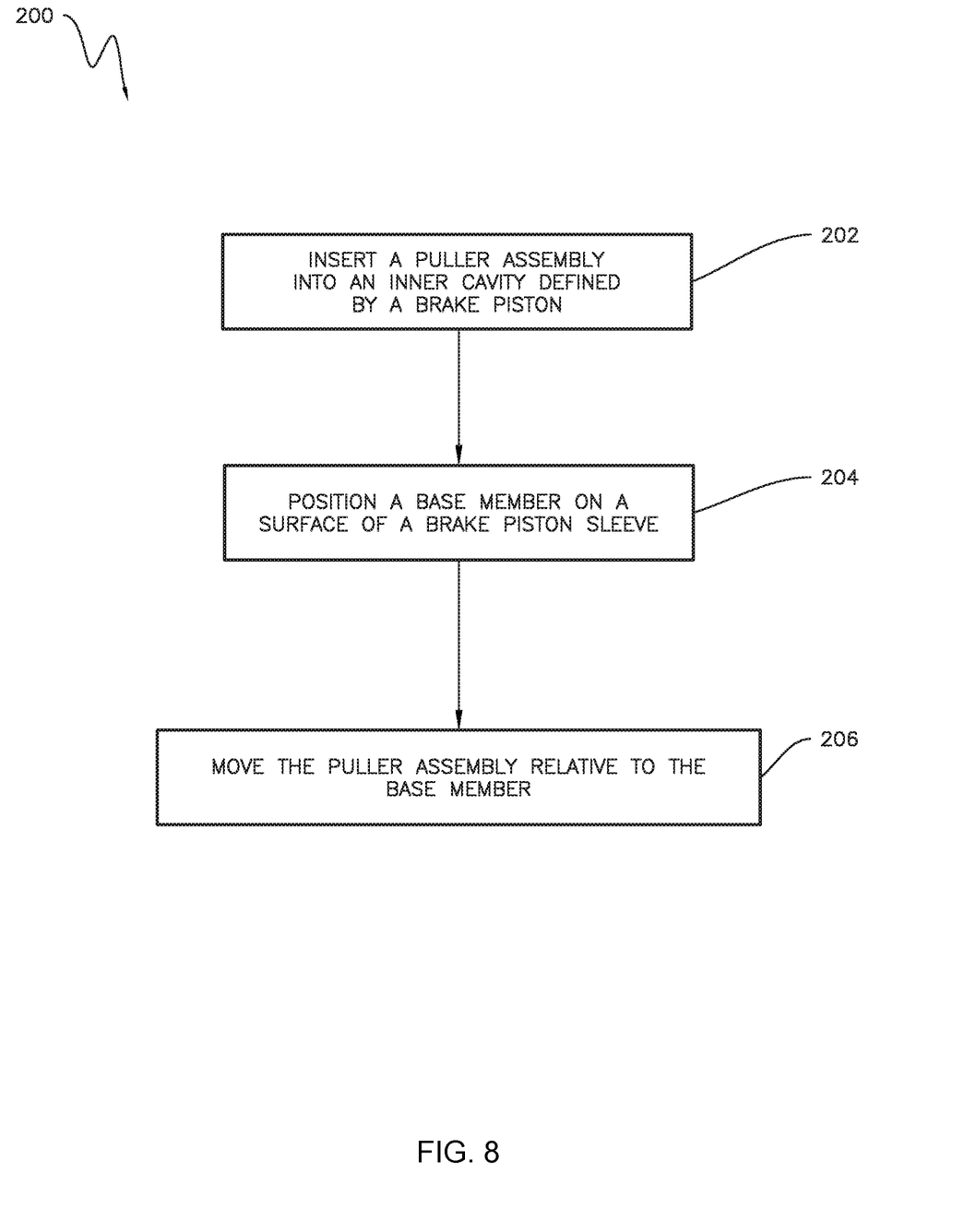
FIG. 8 is flow chart illustrating a method for removing a brake piston from a brake assembly of a wind turbine in accordance with embodiments of the present disclosure.

FIG. 8 illustrates one embodiment of a method 200 for removing a brake piston from a brake assembly of a wind turbine. In general, the method 200 will be described below with reference to the wind turbine 10 and the tool 100. Nevertheless, the disclosed method 200 may be utilized to remove brake pistons from brake assemblies for any wind turbine having any suitable configuration. Furthermore, although FIG. 8 depicts steps performed in a particular order for purposes of illustration and discussion, the methods discussed herein are not limited to any particular order or arrangement. In this respect, the various steps of the methods disclosed herein can be omitted, rearranged, combined, and/or adapted in various ways without deviating from the scope of the present disclosure.

As shown in FIG. 8, at (202), the method 200 includes inserting a puller assembly into an inner cavity defined by a brake piston. For example, the puller assembly 104 may be inserted into the inner cavity 56 of the brake piston 50 such that the collet 106 is positioned within the inner cavity 56. As such, the teeth 138 on the arms 132 of the collet 106 may engage or otherwise grip the inner surface 64 of the brake piston 50. In some embodiments, inserting the puller assembly 104 may include positioning the second shaft 150 within the passage 124 defined by the first shaft 122.

Furthermore, at (204), the method 200 includes positioning a base member on a surface of a brake piston sleeve. For example, the base member 102 may be positioned on the brake piston sleeve 48 such that the bottom surfaces 118 of the legs 110 of the base member 102 are positioned on the top surface 66 of the brake piston sleeve 48. In some embodiments, positioning the base member 102 may include aligning the first shaft 122 with the aperture 116 in the pull plate 108.

Additionally, at (206), the method 200 includes moving the puller assembly relative to the base member. For example, the nut 156 may threadingly engage the first shaft 122 such that rotation of the nut 156 relative to the first shaft 122 causes the puller assembly 104 to move relative to the base member 102. As mentioned above, this movement may, in turn, cause the brake piston 50 to slide relative to the brake piston sleeve 48, thereby facilitating removal of the brake piston 50 from the brake assembly 46. In some embodiments, moving the puller assembly 104 may include positioning the thrust bearing 158 between the nut 156 and the pull plate 108 of the base member 102.

In some embodiments, the method 200 may include sliding a disk of the puller assembly relative to the collet. For example, the disk 142 of the puller assembly 104 may be slid relative to the collet 106 in the first direction 146 to move the collet 106 into engagement with the inner surface 64 of the brake piston 50. The disk 142 of the puller assembly 104 may also be slid in a second direction 148 to move the collet 106 out of engagement with the inner surface 64 of the brake piston 50. In some embodiments, the disk 142 may be slid relative to the collet 106 by moving the second shaft 150 relative to the first shaft 122.

Unlike conventional tools and methods, the tool 100 and the method 200 described above facilitate the removal of the brake piston 50 from the brake assembly 46 without the need for cutting or other expensive and time-consuming processes. In this respect, the use of the tool 100 and the method 200 reduce the cost and decrease the amount of time necessary to remove brake pistons from brake assemblies of wind turbines compared to the use of convention tools and methods.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for removing brake pistons from brake assemblies of a wind turbine, the system comprising:
   a brake piston assembly including a brake piston sleeve having an inner surface defining a through hole and a brake piston positioned within the through hole of the brake piston sleeve, the brake piston including an inner surface extending parallel to the inner surface of the brake piston sleeve, the inner surface of the brake piston defining an inner cavity;
   a base member placed on a surface of the brake piston sleeve; and,
   a puller assembly inserted in to the inner cavity, the puller assembly including a first shaft and a collet coupled to the first shaft, the first shaft being moveable relative to the base member, the collet including a plurality of arms engaging the inner surface of the brake piston, each of the plurality of arms including a first arm portion extending from a first end coupled to the first shaft outward toward the inner surface of the brake piston sleeve to a second end, each of the plurality of arms further including a second arm portion oriented perpendicularly relative to the first arm portion such that the second arm portion is parallel to the inner surface of the brake piston, the second arm portion extending from a first end protruding from the second end of the first arm portion to a second end, the first end of the first arm portion being positioned closer to the first shaft than the first end of the second arm portion, the second end of the second arm including a plurality of teeth configured to engage the inner surface of the brake piston,
   wherein moving the first shaft relative to the base member slides the brake piston relative to the brake piston sleeve.

2. The system of claim 1, wherein the puller assembly comprises a disk positioned in sliding engagement with the second end of the second arm portion of each of the plurality of arms, wherein sliding the disk in a first direction moves the plurality of teeth into engagement with the inner surface of the brake piston and sliding the disk in a second direction moves the plurality of teeth out of engagement with the inner surface of the brake piston, the second direction being opposite of the first direction.

3. The system of claim 2, wherein the puller assembly comprises a second shaft coupled to the disk, the second shaft being moveable relative to the first shaft to slide the disk relative to the collet.

4. The system of claim 3, wherein the first shaft defines a passage, the second shaft extending through the passage.

5. The system of claim 1, wherein the base member comprises a pull plate and one or more legs extending outward from the pull plate, the one or more legs being configured for placement on the surface of the brake piston sleeve.

6. The system of claim 1, wherein the base member defines an aperture, the first shaft extending through the aperture.

7. The system of claim 1, further comprising:
   a nut that threadingly engages the first shaft, wherein rotating the nut relative to the first shaft slides the first shaft relative to the base member.

8. The system of claim 2, wherein the disk comprises a circumferential surface defining an oblique angle relative to a longitudinal axis of the first shaft, the circumferential surface being in sliding contact with the second end of the second arm portion of each of the plurality of arms.

* * * * *